US011624377B1

(12) United States Patent
Erkal et al.

(10) Patent No.: US 11,624,377 B1
(45) Date of Patent: Apr. 11, 2023

(54) SINGLE SOLENOID-CONTROLLED ELECTRO-HYDRAULIC LIFTOMATIC SYSTEM

(71) Applicant: TURK TRAKTOR VE ZIRAAT MAKINELERI A.S., Ankara (TR)

(72) Inventors: Gul Erkal, Ankara (TR); Atakan Atasoy, Ankara (TR); Murat Melez, Ankara (TR)

(73) Assignee: TURK TRAKTOR VE ZIRAAT MAKINELERI A.S., Ankara (TR)

( * ) Notice: Subject to any disclaimer, the term of this patent is extended or adjusted under 35 U.S.C. 154(b) by 0 days.

(21) Appl. No.: 17/688,930

(22) Filed: Mar. 8, 2022

(51) Int. Cl.
| | |
|---|---|
| *F15B 13/044* | (2006.01) |
| *F15B 13/02* | (2006.01) |
| *F15B 21/10* | (2006.01) |
| *A01B 59/06* | (2006.01) |
| *A01B 63/10* | (2006.01) |

(52) U.S. Cl.
CPC .......... *F15B 13/044* (2013.01); *F15B 13/024* (2013.01); *F15B 13/027* (2013.01); *F15B 21/10* (2013.01); *A01B 59/068* (2013.01); *A01B 63/10* (2013.01); *F15B 2211/426* (2013.01)

(58) Field of Classification Search
CPC .............. F15B 11/15; F15B 2211/3138; F15B 2211/31529; F15B 2211/7052; A01B 59/068; A01B 63/10
See application file for complete search history.

(56) References Cited

U.S. PATENT DOCUMENTS

| | | | | | |
|---|---|---|---|---|---|
| 3,487,958 | A | * | 1/1970 | Costa ...................... | E02F 3/434 414/685 |
| 4,085,806 | A | * | 4/1978 | Osujyo ................ | A01B 63/112 172/7 |
| 4,132,273 | A | * | 1/1979 | Mortonson .............. | G05D 3/12 172/7 |
| 4,357,031 | A | * | 11/1982 | Berg ...................... | B62D 49/02 180/900 |
| 4,389,058 | A | * | 6/1983 | Cadwell ................. | B60D 1/465 280/416.2 |
| 4,438,818 | A | * | 3/1984 | Treichel ............... | A01B 63/112 172/9 |
| 4,503,916 | A | * | 3/1985 | Wiegardt ............ | A01B 63/1117 172/3 |
| 4,677,542 | A | * | 6/1987 | Kasten ................ | A01B 63/1117 702/41 |

(Continued)

FOREIGN PATENT DOCUMENTS

| | | | | |
|---|---|---|---|---|
| DE | 102016222362 A1 | * | 5/2018 | |
| EP | 2597209 A1 | * | 5/2013 | ............ E02F 9/2203 |
| WO | WO-2015019942 A1 | * | 2/2015 | ............ A01B 63/10 |

*Primary Examiner* — Thomas E Lazo
(74) *Attorney, Agent, or Firm* — Bayramoglu Law Offices LLC (57) ABSTRACT

A single solenoid-controlled electro-hydraulic liftomatic system is provided. The single solenoid-controlled electro-hydraulic liftomatic system is developed for controlling electrically, automating a hydraulic mechanism used in three-point hitch systems of tractors lifted and lowered by a mechanically controlled hydraulic mechanism. The single solenoid-controlled electro-hydraulic liftomatic system includes an actuator, a hydraulic pump, a safety element, a tank line, a valve body, a hydraulic piston, at least one solenoid valve, a piston spring, a check valve, a time-delay relay, and a button.

4 Claims, 7 Drawing Sheets

(56) References Cited

U.S. PATENT DOCUMENTS

| | | | | |
|---|---|---|---|---|
| 5,320,186 | A * | 6/1994 | Strasser | E02F 9/2029 |
| | | | | 172/7 |
| 5,421,416 | A * | 6/1995 | Orbach | A01B 63/1117 |
| | | | | 172/3 |
| 5,472,056 | A * | 12/1995 | Orbach | A01B 63/1117 |
| | | | | 172/7 |
| 6,131,062 | A * | 10/2000 | Nielsen | H04L 67/12 |
| | | | | 701/29.2 |
| 6,273,492 | B1 * | 8/2001 | Schroder | B60J 7/1273 |
| | | | | 60/431 |
| 6,920,940 | B2 * | 7/2005 | Casali | A01B 59/068 |
| | | | | 172/439 |
| 6,991,042 | B2 * | 1/2006 | Ochi | A01B 59/068 |
| | | | | 172/439 |
| 7,142,968 | B2 * | 11/2006 | Alexander | A01B 63/1117 |
| | | | | 701/1 |
| 11,434,941 | B2 * | 9/2022 | Matsuda | F15B 15/204 |
| 2012/0180878 | A1 * | 7/2012 | Greenwood | A01B 63/1006 |
| | | | | 137/488 |
| 2019/0116718 | A1 * | 4/2019 | Ito | F15B 13/02 |
| 2020/0221626 | A1 * | 7/2020 | Gomes | A01B 59/002 |
| 2020/0317066 | A1 * | 10/2020 | Yamanaka | A01C 17/005 |
| 2022/0136212 | A1 * | 5/2022 | Ladhe | E02F 9/2203 |
| | | | | 60/552 |

* cited by examiner

SINGLE SOLENOID-CONTROLLED ELECTRO-HYDRAULIC LIFTOMATIC SYSTEM

TECHNICAL FIELD

The invention relates to a single solenoid-controlled electro-hydraulic liftomatic system developed for controlling electrically, automating the hydraulic mechanism used in three-point hitch systems of tractors that are lifted and lowered by means of a mechanically controlled hydraulic mechanism.

BACKGROUND

Hydraulic lift and three-point hitch system connected to the hydraulic lift are used to lift the equipment in tractors. Liftomatic system is the mechanism that mechanically controls the hydraulic lift by hand. This mechanism causes more arm movement and applying more force during use. In order to bring the mechanically controlled hydraulic lift arms to the desired position, the mechanism that triggers this arm is controlled with leverage by the user by hand. Since this system is commonly used by the farmer on the tractor, it can reach such an extent that wears the user out. In the existing liftomatic system, movement is provided by spiral and spring system, and the hydraulic piston is driven by two solenoids. In similar applications, the hydraulic piston is driven by two solenoids. In the specified system, the hydraulic piston is driven by a single solenoid. While the solenoid is deactivated, the system is returned to its initial position by means of a spring.

SUMMARY

In order to eliminate the above-mentioned disadvantages By means of said system, the user can control the hydraulic lift by pressing a button without applying any force. The system can be activated easily.

The three-point hitch system is hydraulically triggered by the piston in the lift. In the specified system, the hydraulic piston is driven by a single solenoid. While the solenoid is deactivated, the system is returned to its initial position by means of a spring. By means of the hydraulic mechanism, the user can activate the system by pressing a button without applying any force.

The movement is provided by a single-acting hydraulic cylinder (piston), relay and a solenoid with this invention. This causes the system cost to be reduced. The mechanism is activated with a button without the need for mechanical force with this invention.

In order to achieve all objects mentioned above and will emerge from the following detailed description, the present invention relates to an electro-hydraulic liftomatic system.

In a preferred embodiment of the invention said Sub-components are Pressure relief valve (1), Hydraulic Piston (3), Solenoid valve (4), piston spring (5) and Check valve (6).

As a valve body's material, high-strength spheroidal cast material is used.

REFERENCE NUMBERS

P Hydraulic pump
T Tank line
1 Pressure Relief Valve
2 Valve Body
3 Piston
4 Solenoid Valve
5 Piston Spring
6 Check Valve
7 Time-Delay Relay
8 Button
9 Actuator

DETAILED DESCRIPTION OF THE EMBODIMENTS

In this detailed description, novelty of the invention is only explained by way of examples that will not have any limiting effect for understanding the subject matter better.

The invention describes a single solenoid-controlled electro-hydraulic liftomatic system developed for controlling electrically, automating the hydraulic mechanism used in three-point hitch systems of tractors that are lifted and lowered by means of a mechanically controlled hydraulic mechanism.

The basic elements used in the invention are explained as actuator to pressurize the line, Hydraulic pump (P), pressure relief valve (1), tank line (T), valve body (2), hydraulic piston (3), Solenoid valve (4), piston spring (5), check valve (6), button (8) and time-delay relay (7).

Figure 4:
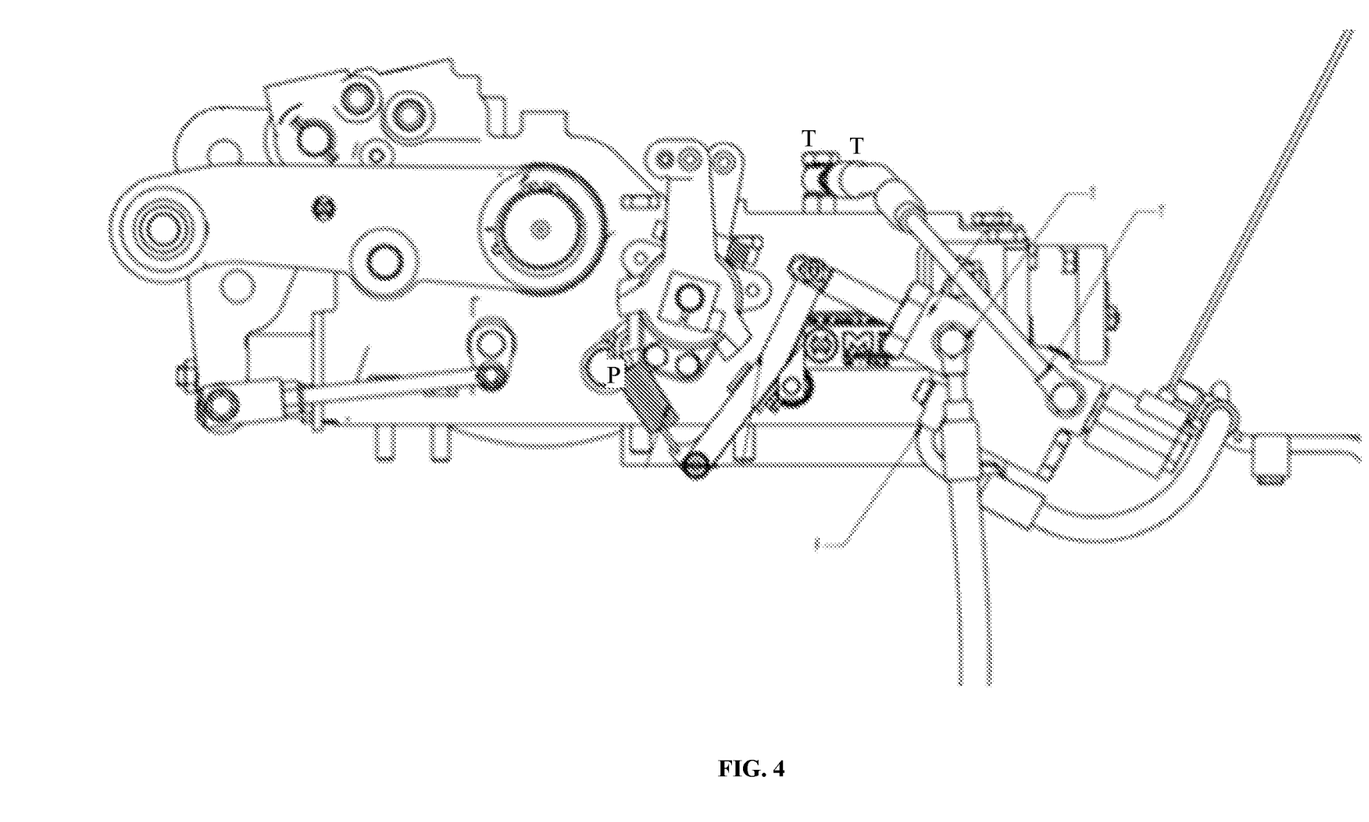
FIG. 4 shows a view of the invention on a tractor

Thanks to the invention, three-point hitch apparatus of the tractor operates according to principle of activating and deactivating the Solenoid valve (4) by pressing a button, without using mechanical power by the user. When the solenoid valve (4) is active, the three-point hitch system lowers, and when the Solenoid valve (4) is deactivated, the mechanism rises.

Figure 2:
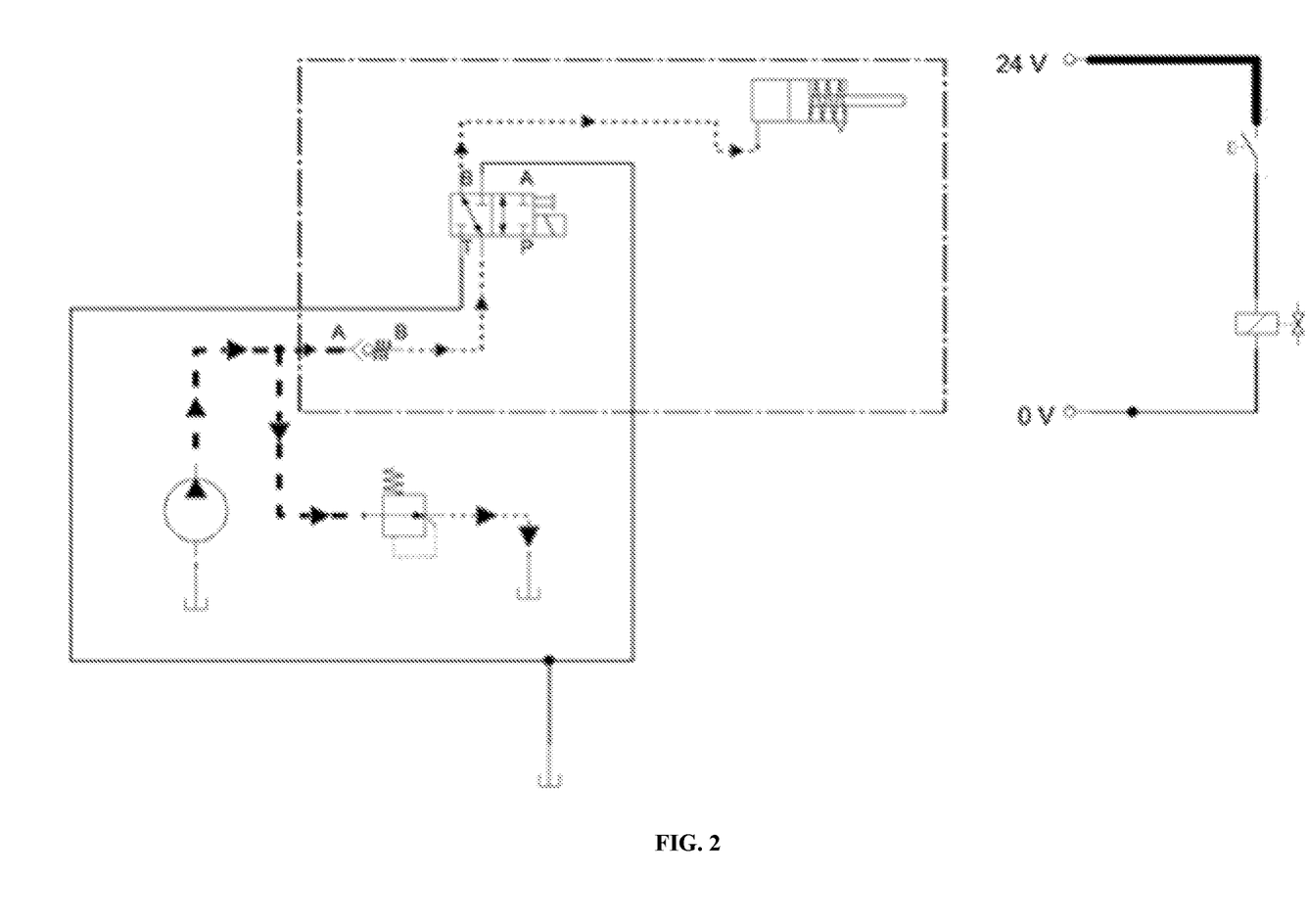
FIG. 2 shows a view of the hydraulic scheme 1 when solenoid is deactivated.
Figure 3:
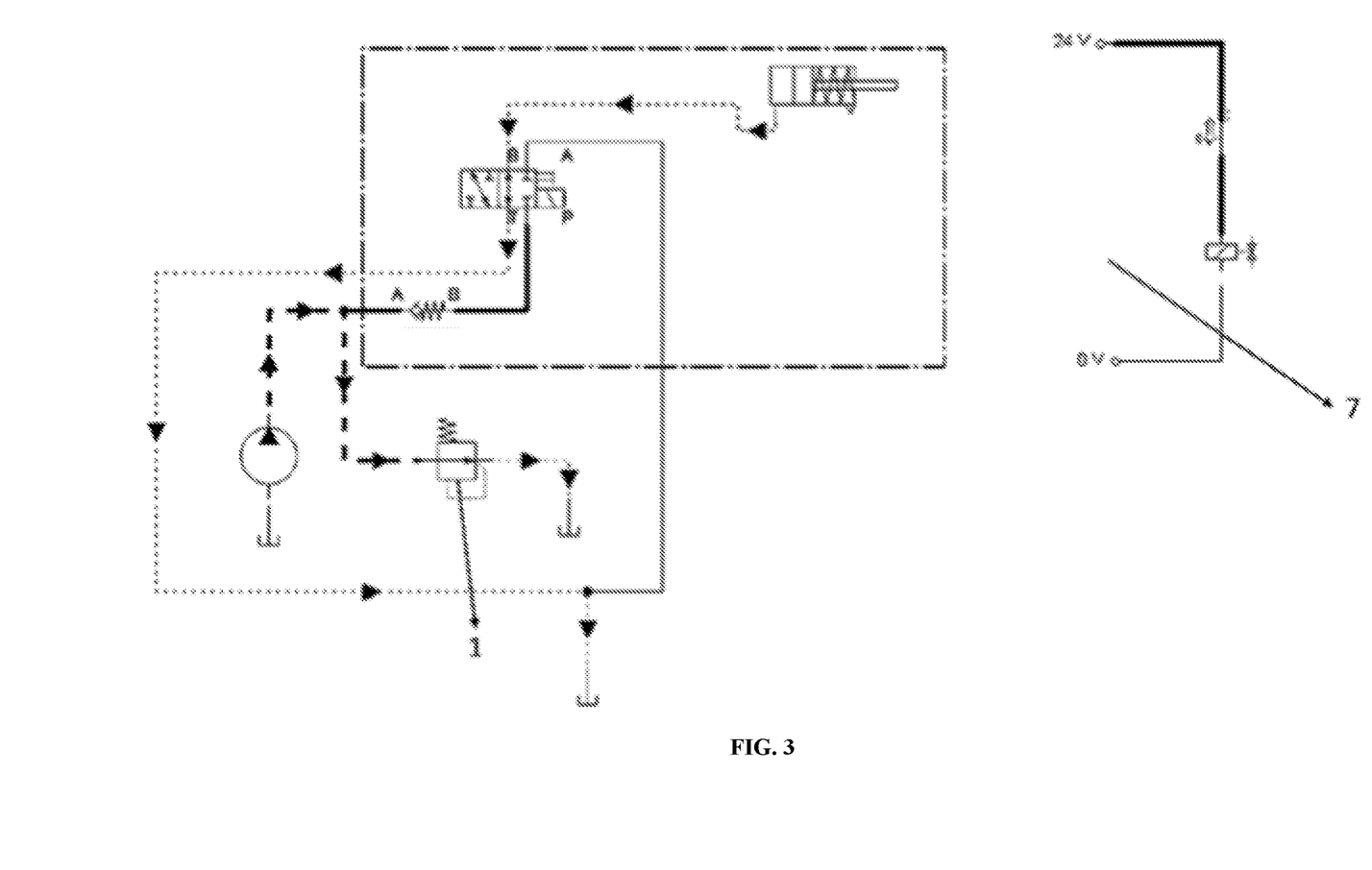
FIG. 3 shows a view of the hydraulic scheme 2 when solenoid is active.

For the hydraulic system to operate, there must be an actuator (9) to pressurize the Hydraulic pump (P) line, a Hydraulic pump (P), a pressure relief valve (1), and a tank line (T) line in the system.

Figure 1A:
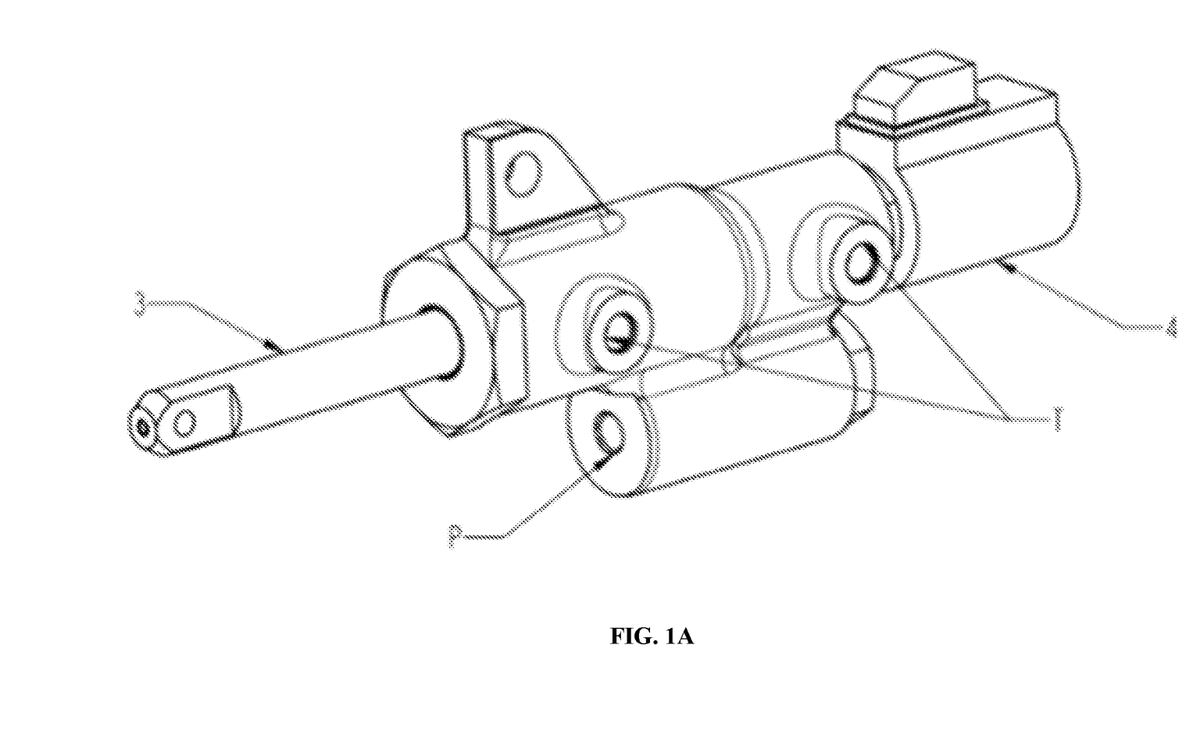
FIG. 1A shows a perspective view of the components.
Figure 1B:
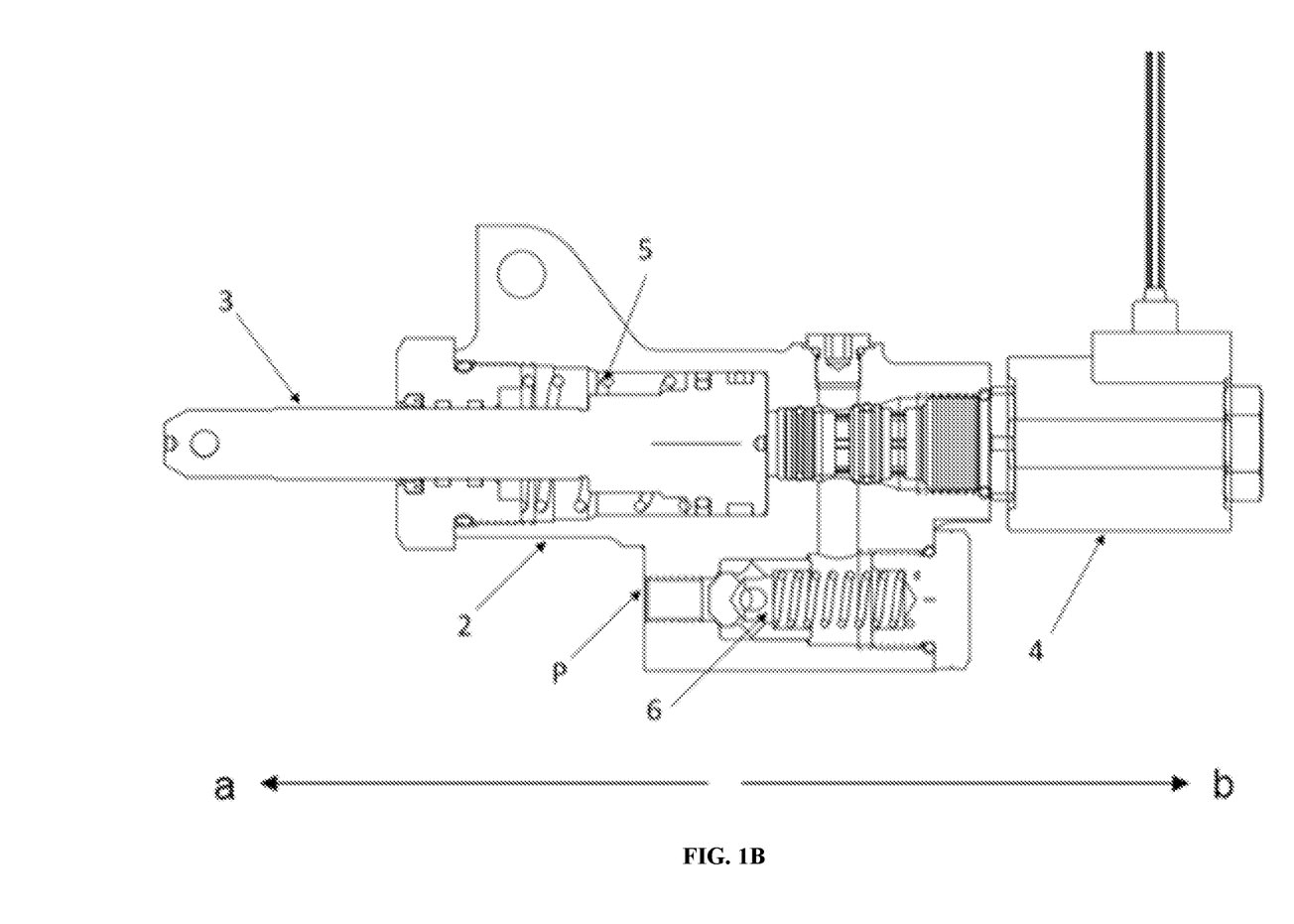
FIG. 1B shows a cross-sectional view of the components.

Valve body (2), Hydraulic piston (3), Solenoid valve (4), piston spring (5), check valve (6) and time-delay relay (7) are the basic components on the system.

When the solenoid valve (4) is deactivated, the Hydraulic pump (P) to which the Solenoid valve (4) is connected is in an open position and the tank line (T) is in a closed position. In this position, the pressurized oil passes through the Hydraulic pump (P) and reaches the rear surface of the Hydraulic piston (3). Pressurized oil applies a force on the surface of the Hydraulic piston (3). When the applied force starts to cancel out the force of the spring (5), the Hydraulic piston (3) moves in the direction (a). With the movement, the lift arms rise.

While the solenoid valve (4) is active, the Hydraulic pump (P) is closed and the tank line (T) is opened. Pressurized hydraulic fluid in the system moves towards the tank. With this movement, the pressure applied to the Hydraulic piston (3) surface decreases. When the force of the spring (5) cancel outs the applied force, the Hydraulic piston (3) moves in the direction (b). With the movement, the lift arms lower.

Figure 5:
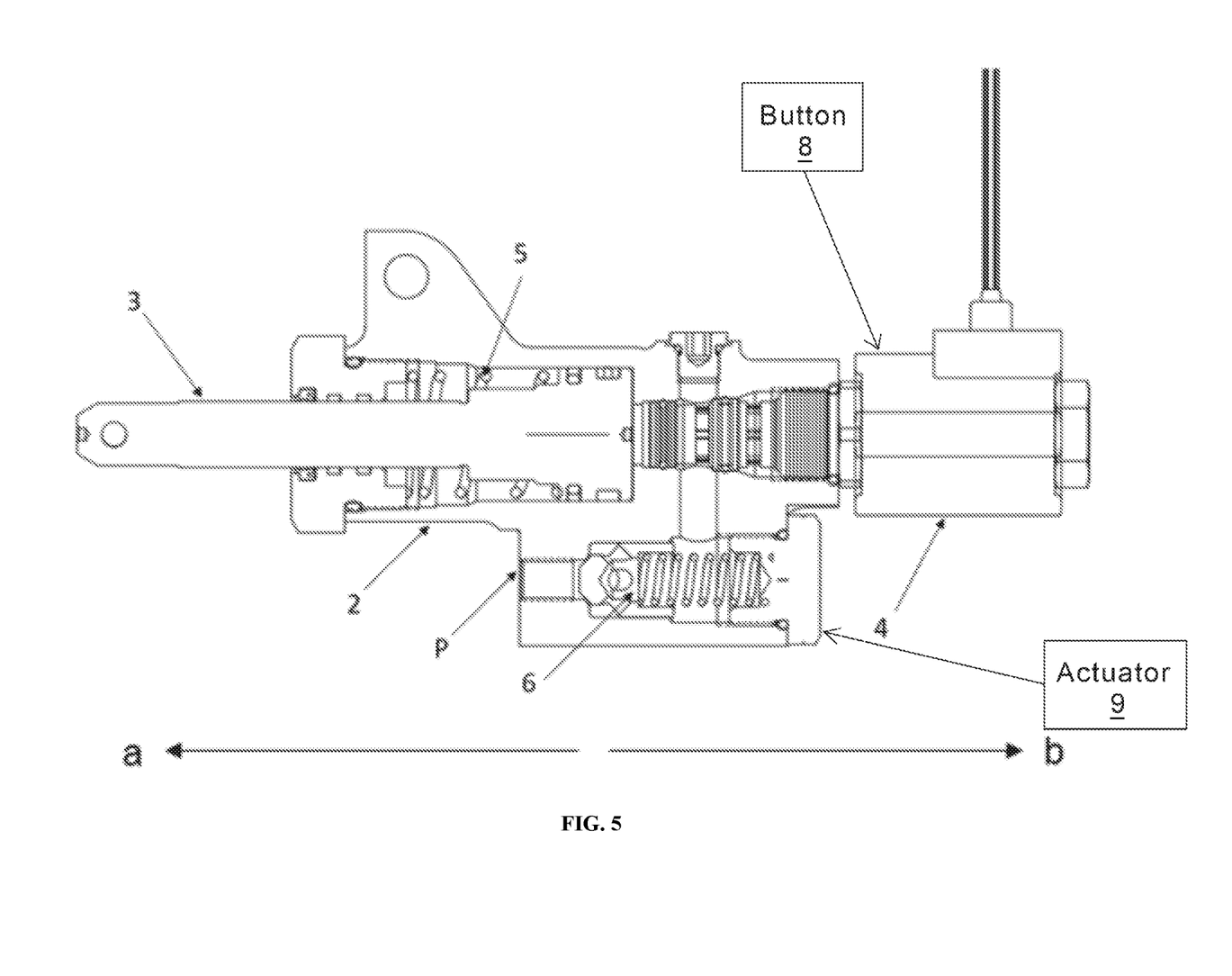
FIG. 5 shows a view of the hydraulic scheme 1 with additional components when the solenoid is deactivated.

While the solenoid valve (4) is active in the system and the arms of the hydraulic lift are in the lower position, when the tractor engine is turned off, the solenoid valve (4) is deactivated instantaneously. However, it is not possible for the hydraulic line to react instantaneously like the power line. Pressurized oil continues to come from the Hydraulic pump (P) for a certain period of time due to the moment of inertia coming from the engine. This situation causes the lift to move upwards uncontrollably when the tractor is turned off and the equipment to move upwards simultaneously. A time-delay relay (7) is added to the system to prevent any undesired movement. When the tractor is turned off, energy is supplied to the time-delay relay (7) directly from the battery. When the tractor is turned off, the time-delay relay (7) supplies to solenoid valve (4) electricity for at least 4 seconds to at most 12 seconds depending on the inertia of the system. Undesired movement in the system will be prevented since the pressurized fluid will be absorbed in this period.

While the operating pressure of the system is 15 bar, oil is sent into the piston after 3.5 bar. Herein, the feature contributing to the system is that 3.5 bar check valve prevents the oil in the cylinder from returning from the pressure line.

A single solenoid-controlled Electro-hydraulic liftomatic system developed for controlling electrically, automating the hydraulic mechanism used in three-point hitch systems that are lifted and lowered by means of a mechanically controlled hydraulic mechanism, in accordance with the detailed information given above, characterized in that it comprises the following:

Actuator which is the element providing the hydraulic power to the system that will pressurize the hydraulic pump (P) line, Hydraulic pump (P), which is the line where the hydraulic power source is connected and from where the power is supplied, The safety element, the Pressure relief valve (1), which provides the operating pressure value of the system, Tank line (T) where the hydraulic system is discharged, Valve body (2), where all sub-components are combined and the main assembly is performed, Hydraulic Piston (3) located in the lift, which converts hydraulic energy into mechanical energy, provides hydraulic triggering of the point hitch system, and provides mechanical control, At least one Solenoid valve (4) that allows the hydraulic piston (3) to be driven, Piston spring (5), which allows the system to return to its initial position when the solenoid valve (4) is deactivated, Check valve (6), which prevents the oil, which should remain pressurized within the hydraulic piston (3), from going back through the Hydraulic pump (P) line with actuator internal leakages, The time-delay relay (7) supplying electricity to the solenoid valve (4) for at least 4 seconds to at most 12 seconds, which prevents the undesired movement in the system since the pressurized fluid will be absorbed when the tractor is turned off Button for activating and deactivating the solenoid valve (4).

The sub-components are Pressure relief valve (1), Hydraulic Piston (3), Solenoid valve (4), piston spring (5) and Check valve (6).

Figure 6:
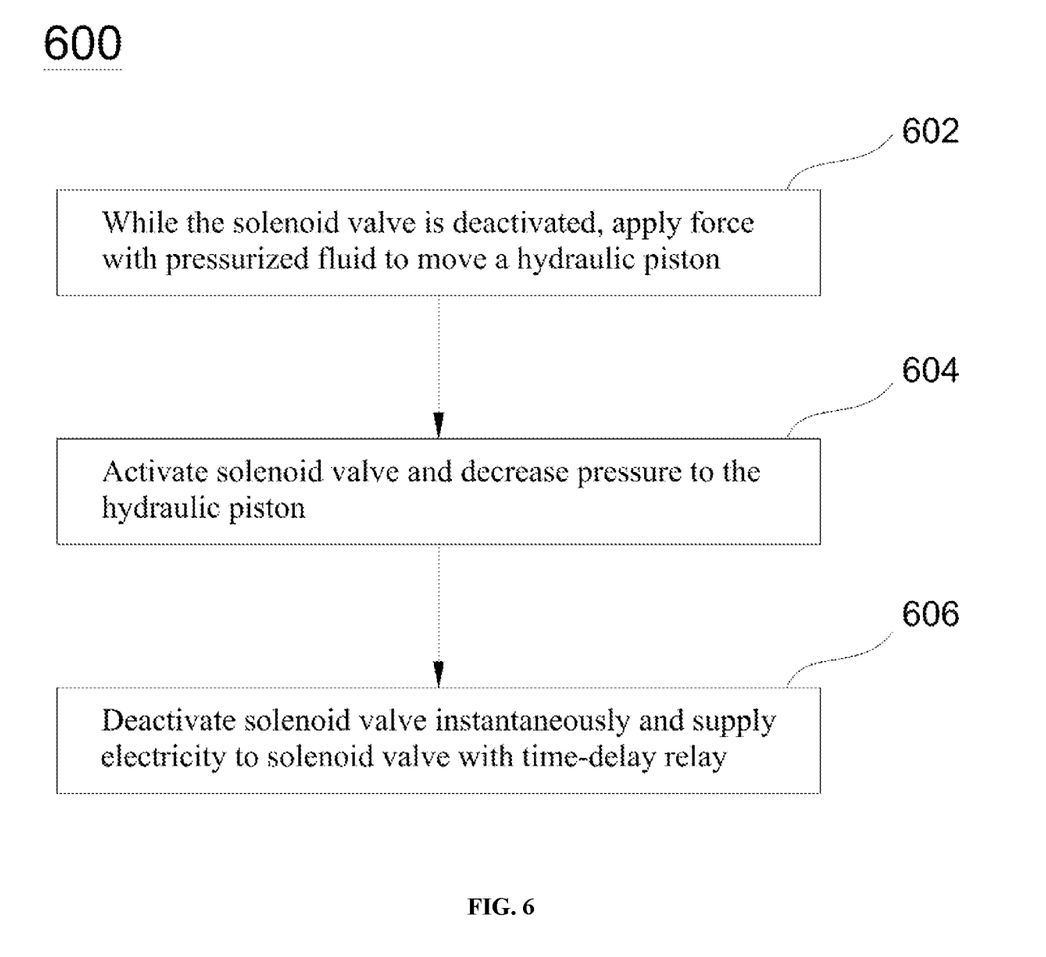
FIG. 6 shows a method of operating the hydraulic scheme 1.

An operating method 600 of the single solenoid-controlled Electro-hydraulic liftomatic system, characterized in that it comprises the following steps:

When the solenoid valve (4) is deactivated at step 602;

The Hydraulic pump (P) to which the solenoid valve (4) is connected is in the open position and the tank line (T) is in the closed position, In this position, the pressurized oil passes through the Hydraulic pump (P) and reaches the rear surface of the piston (3), Pressurized oil applies a force on the surface of the Hydraulic piston (3), When the applied force starts to cancel out the force of the spring (5), the piston (3) moves in the direction (a). With the movement, the lift arms rise, When the solenoid valve (4) is activated at step 604;

The hydraulic pump (P) is closed and the tank line (T) is opened,

Pressurized hydraulic fluid in the system moves towards the tank,

With this movement, the pressure applied to the Hydraulic piston (3) surface decreases, When the force of the spring (5) cancel outs the applied force, the piston (3) moves in the direction (b), With the movement, the lift arms lower, While the solenoid valve (4) is active in the system and the arms of the hydraulic lift are in the lower position, when the tractor engine is turned off;

The solenoid valve (4) is deactivated at step 606 instantaneously,

When the tractor is turned off, energy is supplied to the time-delay relay (7) directly from the battery, When the tractor is turned off, the time-delay relay (7) supplies to solenoid valve (4) electricity for at least 4 to at most 12 seconds, Undesired movement in the system is prevented since the pressurized fluid will be absorbed in this period.

What is claimed is:

1. A single solenoid-controlled electro-hydraulic system developed for automatically controlling electrically a hydraulic mechanism for three-point hitch systems, comprising:

an actuator, wherein the actuator pressurizes a hydraulic pump line, a hydraulic pump, wherein the hydraulic pump is located at the hydraulic pump line, wherein a hydraulic power source is connected to the hydraulic pump line and hydraulic power is supplied from the hydraulic pump line, a safety element, wherein the safety element is a pressure relief valve providing an operating pressure value of the single solenoid-controlled electro-hydraulic system, a tank line where a hydraulic fluid is discharged, a valve body, a hydraulic piston for a hydraulic lift, wherein the hydraulic piston converts a hydraulic energy into a mechanical energy, and wherein the hydraulic piston is configured to provide a hydraulic triggering of the three-point hitch systems, and provides a mechanical control, at least one solenoid valve allowing the hydraulic piston to be driven, a piston spring allowing the single solenoid-controlled electro-hydraulic system to return to an initial position of the single solenoid-controlled electro-hydraulic system when the at least one solenoid valve is activated, a check valve for preventing an oil from going back through the hydraulic pump line, wherein the oil remains pressurized within the hydraulic piston, a time-delay relay, wherein the time-delay relay supplies electricity to the at least one solenoid valve for at least 4 seconds to at most 12 seconds and prevents a movement in the single solenoid-controlled electro-hydraulic system when the at least one solenoid valve is instantaneously deactivated, and a button for activating and deactivating the at least one solenoid valve.

2. The single solenoid-controlled electro-hydraulic system according to claim 1, wherein the pressure relief valve, the hydraulic piston, the at least one solenoid valve, the piston spring and the check valve are combined in the valve body.

3. The single solenoid-controlled electro-hydraulic system according to claim 1, wherein a material of the valve body is a spheroidal cast.

4. An operating method of the single solenoid-controlled electro-hydraulic system according to claim 1, comprising the following steps:

1) Deactivating the at least one solenoid valve to connect the hydraulic pump by placing the hydraulic pump line in an open position and the tank line in a closed position, wherein the hydraulic pump applies a force, with pressurized hydraulic fluid, on a surface of the hydraulic piston by passing the pressurized hydraulic fluid through the at least one solenoid valve such that the pressurized hydraulic fluid reaches the surface of the hydraulic piston, and when the applied force cancels out a force of the piston spring, the hydraulic piston moves in a first direction such that, lift arms of the hydraulic lift are raised, 2) Activating the at least one solenoid valve such that the hydraulic pump line is closed and the tank line is opened, wherein the pressurized hydraulic fluid in the single solenoid-controlled electro-hydraulic system moves towards the tank line such that, a pressure applied to the surface of the hydraulic piston decreases, and when the force of the piston spring cancels out the applied force, the hydraulic piston moves in a second direction such that, the lift arms are lowered, 3) While the at least one solenoid valve in the single solenoid-controlled electro-hydraulic system is activated, allowing the lift arms of the hydraulic lift to lower, turning off a tractor engine, and deactivating the at least one solenoid valve instantaneously, wherein when the tractor is turned off, an energy is supplied to the time-delay relay directly from a battery, and the time-delay relay supplies the electricity to the at least one solenoid valve for at least 4 to at most 12 seconds, and preventing movement in the single solenoid-controlled electro-hydraulic system due to the pressurized hydraulic fluid being absorbed.

* * * * *